Figure 1:
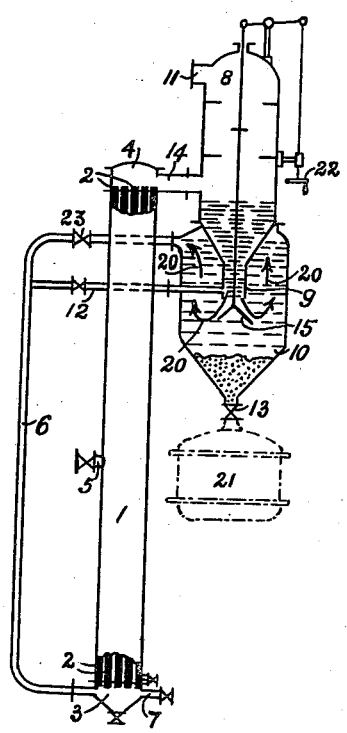

P. KESTNER.
EVAPORATOR.
APPLICATION FILED MAY 13, 1915.

1,191,108.

Patented July 11, 1916.

Paul Kestner
By
K. P. McElroy
Atty.

UNITED STATES PATENT OFFICE.

PAUL KESTNER, OF LILLE, FRANCE, ASSIGNOR TO KESTNER EVAPORATOR COMPANY, OF PHILADELPHIA, PENNSYLVANIA, A CORPORATION OF PENNSYLVANIA.

EVAPORATOR.

1,191,108.

Specification of Letters Patent. Patented July 11, 1916.

Application filed May 13, 1915. Serial No. 27,890.

*To all whom it may concern:*

Be it known that I, PAUL KESTNER, a citizen of the French Republic, residing at Lille, in the Nord Province of France, have invented new and useful Improvements in and Relating to Evaporators, of which the following is a specification.

This invention has reference to improvements in and relating to evaporating apparatus for use in recovering salts from saline solutions, the apparatus being of that type in which an evaporator and a separator are so connected that the saline solution circulates through both, the water being evaporated off in the former and the salt deposited in the latter.

My invention, *inter alia* consists in a particular construction of evaporating apparatus for the aforesaid purpose, in which the component parts viz. the evaporator and the separator are each of known construction.

My invention may therefore be said to consist in the combination of known parts but from such combination more useful results are to be obtained than from any construction of evaporating apparatus for the purpose aforesaid heretofore known.

It is essential for the purpose of my invention (1) that the evaporator be a "Kestner" evaporator in which the liquid is made to climb up vertical evaporation tubes in the form of very thin films; (2) that the position of the evaporator relatively to the separator is such that the upper ends of the evaporation tubes in the evaporator are above the highest level at any time of the liquid in the separator. By the first of these essentials the thin ascending or climbing film of liquor forms around the whole of the inner surface of all the tubes which it would obviously not do were the tubes otherwise than vertical and by the second the flooding of the tubes is obviated. As a result a very rapid circulation of the saline liquid and also a very rapid evaporation of the water therefrom are attained and the coating or incrustation of the inner surfaces of the tubes is to a very appreciable extent prevented or retarded.

My invention also comprises means whereby the tubes in the evaporator may be cleaned or washed without necessitating the emptying of the separator and further, when two evaporators are used in conjunction with a single separator I provide improved means whereby alternatively both evaporators may be in use at the same time or either one of them may be cut out for cleaning or repair.

Figure 2:
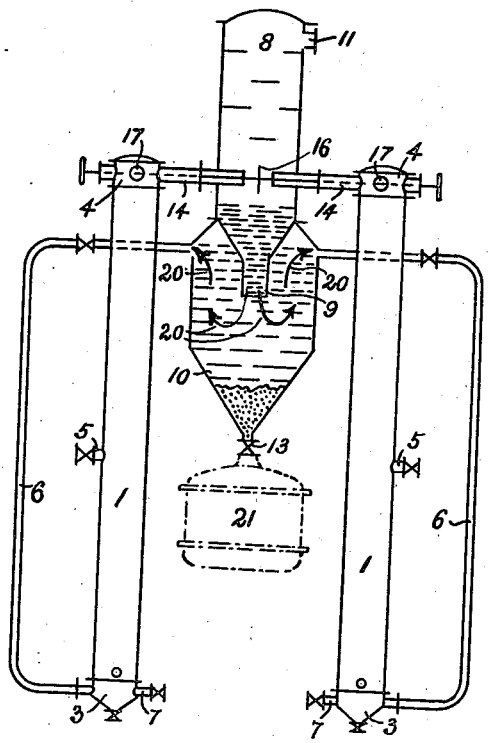

My invention is illustrated diagrammatically in the accompanying drawing, Figure 1 showing a single evaporator connected up to a separator and Fig. 2 showing two evaporators connected up to a single separator— both being sectional side elevations.

As will be recognized from the drawing, in my improved evaporating apparatus both the evaporator and the separator are of known construction, the former being the well known "Kestner" evaporator comprising a casing 1 inclosing vertical tubes 2 the ends of which pass through tube plates at the top and bottom respectively of the casing and having upper and lower chambers 4 and 3 respectively; to the latter of which the liquor to be concentrated is supplied through a pipe 7. The separator comprises two chambers an upper one 8 and a lower one 10 the upper one being made conical at its lower end and formed with a neck 9, the conical part and neck extending into the lower chamber.

In accordance with my invention and as will be seen from the drawings the upper end of the tubes of the evaporator is slightly above the normal level of the liquor in the separator so that the liquor may flow directly into the separator through a horizontal pipe 14. There is therefore no solid column of liquor at any point above the head of the tubes of the evaporator. The result of this is that the liquor ascends in the form of films up each of the tubes 2 in the well known manner, the speed of upward travel through said tubes being very rapid, and consequently there is practically no incrustation of the tubes 2 even when the apparatus has been working for a considerable length of time. It is well known that when a saline solution is being evaporated by passing it through externally heated tubes, the more rapid the liquor travels the less the incrustation or scaling and vice versa. In order that the speed of travel of the ascending film of liquor in the tubes 2 shall be still further increased I make the evaporator of very considerable length (still having its top above the level of the liquor in the separator) compared with the separator, so that the liquor is exposed to a very large heating surface.

As will be seen from the drawing the liquor circulates through the separator as indicated by the arrows 20 and passes from the lower chamber 10 through the pipe 6 into the bottom chamber 3 of the evaporator. It then ascends very rapidly in the form of films up the tubes 2 and from there passes along the horizontal pipe 14 into the upper chamber 8 of the separator. Steam for heating the liquor is admitted at 5 and the water of condensation removed through a suitable valve at the bottom of the casing. As evaporation takes place fresh liquor is admitted to the chamber 3 through the pipe 7, but it is essential to take care that the level of the liquor in the separator at no time is high enough to reach the tubes 14. The bottom end of the separator may have connected to it a salt-removing device and filter 21 of a known type so that by periodically opening a valve or cock 13 the salt deposited—together with a small quantity of liquor—will fall thereinto. The liquor is then filtered off (the valve 13 having of course been closed) and the salt removed through a suitable door (not shown). In Fig. 2 a similar construction of evaporating apparatus is shown but in this case there are two evaporators connected up with a single separator.

In order that both, or one or other only, of the two evaporators may be in use, I provide improved means comprising a double valve 16 located in the separator between the inlets from the evaporator, which valve is carried by a rod projecting at its ends through the respective evaporators, the arrangement being such that when the valve is about midway of the said inlet pipe (as shown)—both evaporators are connected up with the separator. By moving the rod from either side in one direction or the other the valve 16 will be seated against one or other of the inlet pipes and so shut off or cut out the corresponding evaporator which may then be cleaned or repaired.

In order that the tubes in the evaporator may be cleaned or washed without requiring the whole of the liquor to be withdrawn I provide the lower end or neck 9 of the upper chamber (see Fig. 1) of the separator with a valve 15 which is controlled by a hand wheel 22 or other suitable means and I connect the lower end of said neck 9 by a pipe 12 with the pipe 6, the arrangement being such that by closing said valve 15 and also the valve 23 on the pipe 6, clean water—in place of the salt solution—may be made to circulate through the tubes 2 of the evaporator and the upper chamber 8 of the separator to thereby dissolve or remove any incrustation in the pipes 2 without it being necessary to empty the lower chamber 10 of the separator. The wash water flows out through outflow pipes 17 (Fig. 2) provided with suitable valves. The steam given off is conducted away through an opening 11 at the top of the separator.

As compared with evaporators of the type specified as heretofore constructed or proposed my improved evaporator is more efficient because the tubes remain clean for a much longer period and the incrustation when it takes place is much slower. Further it is not necessary to wash the tubes so frequently and the consumption of steam, cost of labor, &c., required for washing or cleaning is thus much reduced.

What I claim as my invention and desire to secure by Letters Patent is:—

1. In a salt-making apparatus, the combination of a salt-separating chamber having a vapor outlet and means for discharging crystallized salt with a bottom fed vertical tube evaporator having at its top a liquid and vapor discharge conduit entering said separator at a point above the normal liquid level therein and a feed conduit for said evaporator connecting a point in said separator below said liquid level but above the salt discharging means with the bottom feed inlet of said evaporator.

2. In a salt-making apparatus, the combination of a salt-separating chamber having a vapor outlet and means for discharging crystallized salt with a plurality of bottom fed vertical tube evaporators having at their tops vapor and liquid discharge conduits entering said separator at points above the normal liquid level therein, feed conduits connecting the feed inlet at the bottom of each said evaporators with points in said separators below said liquid level but above the salt discharging means and a valve adapted to close or open the delivery ends of said discharge conduits in said separator.

3. In salt-making apparatus, the combination of a bottom fed vertical tube evaporator with a salt-separating chamber receiving liquid and vapor from the top of said evaporator and delivering liquid to the base of said evaporator, said separator comprising vapor discharge means at the top of the chamber and crystal discharge means at the bottom, an intermediate funnel shaped septum having a central opening, and located between the points of liquid inlet and liquid outlet from and to said evaporator and a rod controlled valve for closing said opening.

In testimony whereof I have signed my name to this specification in the presence of two subscribing witnesses.

PAUL KESTNER.

Witnesses:
A. E. WILLIAMS,
M. M. S. PATTON.